UNITED STATES PATENT OFFICE.

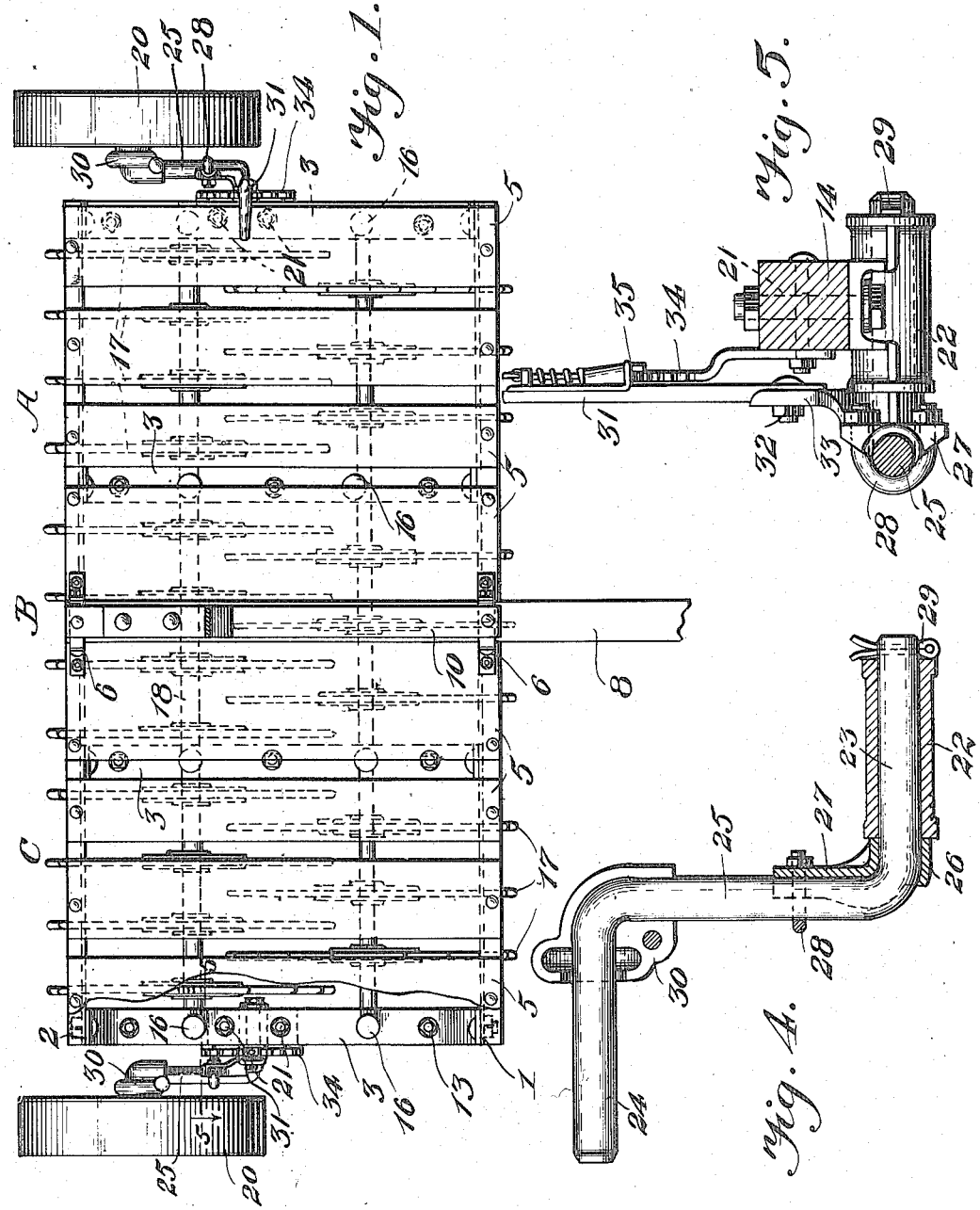
W. S. GRAHAM.
ROTARY HOE.
APPLICATION FILED JUNE 22, 1914.
1,128,869.
Patented Feb. 16, 1915.
2 SHEETS—SHEET 1.
WITNESSES:
Ray Fortenbach
Chas W Gray
INVENTOR
William S. Graham.
BY
William C. Sinton.
ATTORNEY

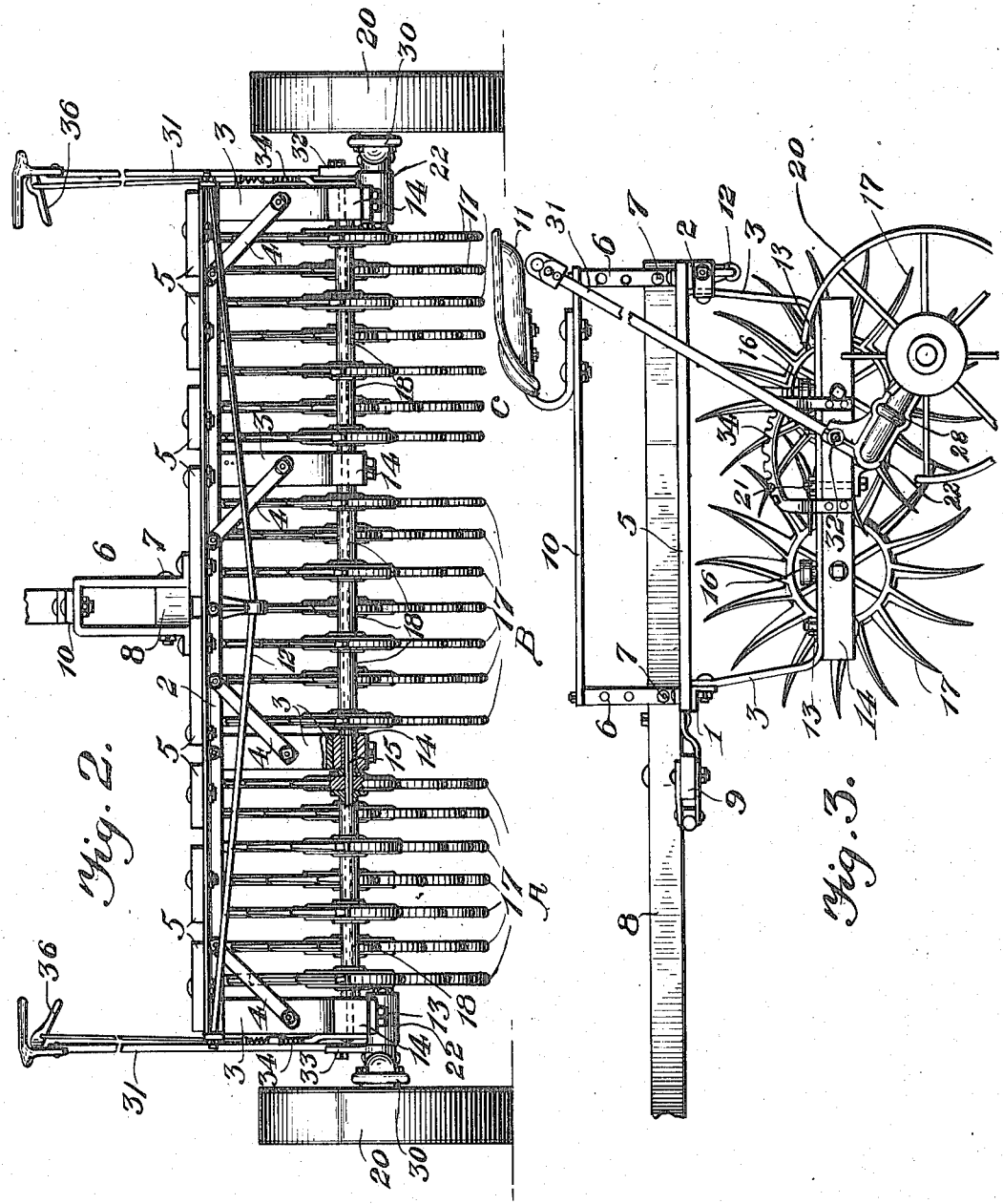

WILLIAM S. GRAHAM, OF CANTON, ILLINOIS, ASSIGNOR TO PARLIN & ORENDORFF COMPANY, OF CANTON, ILLINOIS, A CORPORATION OF ILLINOIS.

ROTARY HOE.

1,128,869.      Specification of Letters Patent.      Patented Feb. 16, 1915.

Application filed June 22, 1914. Serial No. 846,647.

*To all whom it may concern:*

Be it known that I, WILLIAM S. GRAHAM, a citizen of the United States, residing at Canton, in the county of Fulton and State of Illinois, have invented new and useful Improvements in Rotary Hoes, of which the following is a specification.

In loosening the ground close to the roots of corn and like plants cultivators having shovel blades have been provided, but in using shovel cultivators for breaking crusty soil, they do not break the soil into fine pieces as required, and the large clods of soil are often dragged with the cultivator shovels or blades over the field, which results in the pulling up of the plants by the roots or breaking the same. To overcome this I have provided the present invention which relates to rotary hoes having rotating blades or fingers which dig into and loosen the soil, breaking the crust into fine pieces whereby no clods or other foreign matter can be carried with the blades over the field, and at the same time leaving the ground well aired close to the roots of the plants.

One of the objects of the invention is to provide means whereby the hoe may be raised and lowered relative to the ground so as to regulate the depth at which the hoe blades or fingers work to suit the requirements, and also being adapted to raise the hoe blades clear above the ground for transportation.

It is another object of the invention to improve devices of this type in sundry details hereinafter pointed out.

The preferred means by which I accomplish my objects are illustrated in the accompanying drawings and are hereinafter specifically described.

In the drawings; Figure 1 is a plan view embodying my invention. Fig. 2 is a rear elevation showing a part thereof in section. Fig. 3 is a side elevation having a portion of one support wheel broken away. Fig. 4 is a detail section showing one of the supporting axes, and Fig. 5 is a vertical section taken in the line 5—5 of Fig. 1 in the direction of the arrows as shown.

Referring to the drawings wherein like and corresponding parts are designated by similar characters throughout the several views, the frame of the device comprises a front and rear angle bar indicated by the numerals 1 and 2 respectively. These bars are connected by transverse U-shaped bars 3, being four in number and spaced apart as shown. The transverse bars are braced to the bars 1 and 2 by means of brackets 4.

Secured to the angle bars are boards 5 forming a platform upon which weight may be applied when working in ground having a heavy crust, and which also prevents the operator from coming in contact with the hoe points, as will be hereinafter more fully described. Mounted upon the platform at its medial portion are a pair of inverted U-shaped bars 6 to which is secured by means of bolts 7 the inner end of the draft tongue 8, the latter carrying an evener 9 secured to the under side thereof, as shown in Fig. 3. A bar 10 connects the bars 6 and has adjustably mounted thereon the driver's seat 11. A truss rod 12 connects the ends of the rear bar 2 for bracing the frame.

Suspended from and connected to the transverse bars 3 by means of bolts 13 are bearing blocks 14 having journaled therein two parallel shafts 15. These bearing blocks are also supplied with hard grease cups 16 from which oil may be supplied to the shafts. Carried by the shafts are the hoe wheels 17 held in spaced relation by means of the sleeves 18. The hoe wheels comprise a plurality of radially projecting curved fingers being so designed as to effectively penetrate and loosen the soil around the plants. The hoe wheels are divided into three sections, A B and C respectively, each section having three hoe wheels on the front shaft and four hoe wheels on the rear shaft. The hoe wheels are in staggered relation with each other so as to cover the ground thoroughly and break the clods of soil into small pieces. The device shown is to be used when cultivating three rows of plants when the rows of plants are close together, but when it is desired the middle section B may be removed when the rows of corn or other plants are spaced apart and it is not desired to cultivate the ground between the rows. The hoe wheels are keyed upon the squared shafts so that all the wheels will turn in unison, when passing over the ground thereby preventing one or more of the wheels from dragging should the same strike an obstruction.

The carrying wheels 20 are mounted on each side of the device and are adapted to be adjusted whereby the hoe wheels may be raised and lowered so as to regulate the depth at which the hoe fingers work. The hoe wheels may also be raised to clear the ground in transporting the device to and from the field.

Projecting through each of the end blocks 14 and the bars 3 are bolts 21 for fastening a bearing casting 22 to each side of the machine. Each of these bearings has journaled therein, one end 23 of a crank axle and mounted upon the opposite ends 24 of the crank axles are the carrying wheels 20. The medial portions 25 of the axles are bent at right angles to the ends thereof so by oscillating the axles the wheels may be raised and lowered. A casting 26 is mounted upon the end 23 of each axle and each casting has an arm 27 secured to the medial portions of the axles by means of U shaped bolts 28. The sections 23 are retained within the respective bearings 22 by means of the castings 26 and the cotter pins 29.

The numeral 30 indicates a sectional dust proof casting for connecting the carrying wheels 20 to their respective axles.

The means for oscillating the crank axles comprises operating levers 31 each connected as at 32 to arms 33 formed integrally with the castings 26.

A segmental rack 34 is carried by the outer face of each end block 43, which racks are adapted to be engaged by spring actuated detents 35 carried by the levers 31 for retaining the levers in the desired adjusted position. A hand grip 36 is pivoted upon each lever and connected to the detents 35 whereby the operator may easily and readily operate the same.

By having the wheels mounted separately upon two axles they may be operated independently of each other whereby either end of the machine may be raised or lowered to meet the requirements of the unevenness of the ground.

From Fig. 3 it will be noted that the carrying wheels 20 are a little to the rear of the center line of the machine, thereby throwing the weight of the machine forward, but when the operator is in his seat upon the machine, his weight will counterbalance the weight of the machine and thereby relieve the same from the neck of the draft animals.

To obtain effective results the front and rear gangs of the hoe shovels should work on the same level, and to accomplish this the weight of the operator counterbalances the machine and the evener 10 is supported on the under side of the tongue whereby the pull of the draft animals will also help relieve the weight from the necks of the same. By having a single operating wheel on each side of the machine, the machine may be easily raised and lowered, and by counterbalancing the weight of the machine, the front and rear gangs of the hoe wheels will travel over the ground at about the same level.

I claim:

1. In a rotary hoe the combination with a frame, U-shaped bars depending therefrom, bearing blocks carried by the U-shaped bars, a front and rear gang of hoe wheels supported by the bearing block, a bearing box depending from each end bearing block and arranged at one side of the center thereof, a crank axle journaled in each bearing box, supporting wheel carried by the crank axles, means for oscillating the crank axles whereby the frame will be raised and lowered, an operator's seat mounted upon the frame rearwardly of the axes of the wheels whereby the weight of the operator will counterbalance the frame so that upon the raising and lowering of the frame, each gang of hoe wheels will remain at the same level.

2. In a rotary hoe the combination with a frame, U-shaped bars depending therefrom, a bearing block carried by each bar, a pair of parallel axles journaled within said bearing blocks, a bearing box suspended from each end bearing block at one side of the transverse center line of the frame, a crank axle journaled within each bearing box, a supporting wheel carried by each crank axle, means for oscillating the crank axles whereby the frame may be raised or lowered, a draft tongue connected to the medial portion of the frame and extending from one end thereof, an operator's seat mounted upon the frame at the opposite end thereof, whereby the weight of the operator will counterbalance the frame to relieve the draft tongue of any weight from the frame and permit the hoe wheels to travel at the same level when the frame is in its raised or lowered position.

3. The combination with a rotary hoe comprising, a frame and hoe wheels, of supporting wheels arranged on each side of the frame, means for raising and lowering the supporting wheels, a draft tongue adjustably secured to the frame, an operator's seat mounted upon the frame at the rear thereof, an evener secured to the underside of the draft tongue adjacent the rear end thereof
5 whereby the weight carried by the operator's seat and the pull upon the evener will counterbalance the frame and the hoe wheels will work at the same level.

In witness whereof, I hereunto subscribe my name to this specification in the presence 10 of two witnesses.

WILLIAM S. GRAHAM.

Witnesses:
   CHARLES W. GRAY,
   GRAYCE O'BRIEN.